United States Patent
Pafford et al.

(10) Patent No.: US 6,756,462 B2
(45) Date of Patent: Jun. 29, 2004

(54) METHOD FOR PREPARATION OF ANION EXCHANGE RESINS

(75) Inventors: Margaret Mary Pafford, Yardley, PA (US); Jennifer Annette Reichl, St. Davids, PA (US); Bruce Maurice Rosenbaum, Fort Washington, PA (US)

(73) Assignee: Rohm and Haas Company, Philadelphia, PA (US)

( * ) Notice: Subject to any disclaimer, the term of this patent is extended or adjusted under 35 U.S.C. 154(b) by 150 days.

(21) Appl. No.: 10/165,105

(22) Filed: Jun. 7, 2002

(65) Prior Publication Data

US 2003/0018091 A1 Jan. 23, 2003

Related U.S. Application Data

(60) Provisional application No. 60/302,858, filed on Jul. 3, 2001.

(51) Int. Cl.[7] .......................... C08J 5/20; C08F 210/14

(52) U.S. Cl. ...................... 526/347; 526/347.1; 521/27; 521/37; 521/38

(58) Field of Search ................................. 526/347, 347.1

(56) References Cited

U.S. PATENT DOCUMENTS

| 4,225,677 A | | 9/1980 | Boutier et al. |
| 4,636,554 A | * | 1/1987 | Tada et al. ................ 525/359.3 |
| 5,600,022 A | | 2/1997 | Ando et al. |

FOREIGN PATENT DOCUMENTS

| DD | 250128 | | 9/1987 |
| EP | 277795 | | 8/1988 |
| EP | 0 277 795 A2 | * | 8/1988 |
| EP | 223596 | | 5/1990 |
| EP | 0 223 596 B1 | * | 5/1990 |

* cited by examiner

Primary Examiner—Robert Deshon Harlan

(57) ABSTRACT

An improved process for preparing anion exchange resins based on the use of a non-agitated plug-flow quench procedure followed by recycle of a portion of the recovered chloromethylation reaction fluids into subsequent chloromethylation reactions is disclosed. The combination of plug-flow hydration, providing highly concentrated recovered sulfuric acid, together with the recycle or reuse of the recovered concentrated sulfuric acid, allows for reduced raw material requirements during anion exchange resin manufacture and reduces the environmental impact of waste sulfuric acid processing.

14 Claims, No Drawings

METHOD FOR PREPARATION OF ANION EXCHANGE RESINS

CROSS REFERENCE TO RELATED PATENT APPLICATIONS

This is a non-provisional application of prior pending U.S. provisional application serial No. 60/302,858 filed Jul. 3, 2001.

BACKGROUND

This invention relates to an improved process for the preparation of anion exchange resins involving enhanced sulfuric acid recovery and recycle during the chloromethylation step of crosslinked poly(vinylaromatic) copolymer. In particular the present invention concerns the use of a non-agitated plug-flow quench procedure followed by recycle of recovered reaction fluids in subsequent chloromethylation reactions.

Chloromethylation of crosslinked poly(vinylaromatic) copolymer has for many years been carried out using a process where chloromethyl methyl ether ($CH_3OCH_2Cl$ or CME) is prepared and reacted in situ from a reaction mixture containing formaldehyde, methanol, and chlorosulfonic acid (see Equation I). The chloromethylation of crosslinked poly(vinylaromatic) copolymer is depicted in Equation II where "Ar" represents an aromatic ring.

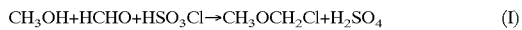

$$CH_3OH + HCHO + HSO_3Cl \rightarrow CH_3OCH_2Cl + H_2SO_4 \quad (I)$$

$$poly(Ar) + CH_3OCH_2Cl \rightarrow poly(ArCH_2Cl) + CH_3OH \quad (II)$$

In view of toxicity and handling problems, the in situ generation and reaction of CME (such as described in EP 277,795 and U.S. Pat. No. 4,225,677) is preferable to processes that generate CME separately, for example, all-CME chloromethylations or chloromethylations where CME itself is recovered or regenerated from chloromethylation reaction mixtures and stored or added as a raw material for subsequent chloromethylation reactions (such as described in U.S. Pat. No. 4,636,554, German Patent Application DD 250,128 and U.S. Pat. No. 5,600,022).

Upon completion of the chloromethylation reaction, the reaction medium is deactivated or quenched by the addition of water or a suitable organic solvent, with mixing or agitation to dissipate heat and ensure complete deactivation. The reaction product is isolated and generally washed in an agitated fashion with water or an organic solvent as well as aqueous sodium hydroxide to remove excess sulfuric acid and degrade any unreacted CME remaining in the beads. Anion exchange resin products are then provided by means of conventional amination reactions. A major disadvantage of the use of CSA as a source of HCl or as a $H_2SO_4$ reaction medium in chloromethylation reactions is the generation of large volumes of waste acid that require treatment and disposal for environmental reasons.

The problem addressed by the present invention is to overcome the deficiencies of prior methods used to prepare anion exchange resins based on sulfuric acid chloromethylations by minimizing usage and subsequent waste disposal requirements of sulfuric acid, while still relying on the conventional sulfuric acid chloromethylation reactions to provide the desired anion exchange resins without any reduction in physical stability characteristics.

STATEMENT OF INVENTION

The present invention provides an improved method for preparing anion exchange resins in a multi-batch process wherein a crosslinked poly(vinylaromatic) copolymer is chloromethylated in the presence of sulfuric acid to provide a mixture of a chloromethylated intermediate and sulfuric acid, followed by quenching the chloromethylated intermediate with quenching solution and finally functionalizing the chloromethylated intermediate with an aminating agent, the improvement comprising (a) quenching the chloromethylated intermediate by a non-agitated plug-flow downward addition of a quench solution to the mixture of chloromethylated intermediate and sulfuric acid to obtain a mother liquor effluent comprising 30 to 90% sulfuric acid; (b) isolating the mother liquor effluent for reuse in subsequent chloromethylation reactions; and (c) chloromethylating additional crosslinked poly(vinylaromatic) copolymer in the presence of sulfuric acid and a portion of mother liquor effluent comprising 30 to 90% sulfuric acid obtained from a prior chloromethylation-quench reaction sequence.

In a further specific embodiment, the present invention provides a method for preparing anion exchange resins in a multi-batch process, comprising (i) in a first chloromethylation reaction, the steps of (a) chloromethylating a first crosslinked poly(vinylaromatic) copolymer in the presence of sulfuric acid to provide a mixture of a first chloromethylated intermediate and sulfuric acid; (b) quenching the first chloromethylated intermediate to provide a quenched first chloromethylated intermediate by a non-agitated plug-flow downward addition of a quench solution to the mixture of first chloromethylated intermediate and sulfuric acid to obtain a first mother liquor effluent comprising 30 to 90% sulfuric acid; and (c) isolating the first mother liquor effluent for reuse in one or more subsequent chloromethylation reactions; and (ii) in a second chloromethylation reaction, the steps of (a') chloromethylating a second crosslinked poly(vinylaromatic) copolymer in the presence of sulfuric acid and a portion of mother liquor effluent obtained from a prior chloromethylation-quench reaction sequence to provide a mixture of a second chloromethylated intermediate and sulfuric acid; (b') quenching the second chloromethylated intermediate to provide a quenched second chloromethylated intermediate by a non-agitated plug-flow downward addition of a quench solution to the mixture of second chloromethylated intermediate and sulfuric acid to obtain a second mother liquor effluent comprising 30 to 90% sulfuric acid; and (c') isolating the second mother liquor effluent for reuse in one or more subsequent chloromethylation reactions. In another aspect, the present invention provides the latter method wherein a portion of the first or second mother liquor effluent is used in one or more subsequent chloromethylation reactions that are repeated as described in part (ii), steps (a') through (c').

DETAILED DESCRIPTION

We have discovered an improved process for preparing anion exchange resins in a multi-batch process based on the use of a non-agitated plug-flow quench procedure followed by recycle of the recovered chloromethylation reaction fluids into subsequent chloromethylation reactions. We have found that the combination of plug-flow quenching, providing recovered sulfuric acid that is highly concentrated, together with the recycle or reuse of the recovered sulfuric acid mixture in selected amounts in subsequent chloromethylation reactions, unexpectedly allows for both (1) reduced raw material requirements during anion exchange resin preparation and reduction of the environmental impact of waste sulfuric acid processing, and (2) production of anion exchange resins meeting all performance specifications of anion exchange resins prepared by conventional agitated-quench non-recycled sulfuric acid chloromethylations.

As used herein, the following terms have the designated definitions, unless the context clearly indicates otherwise. The term "copolymer" refers to polymer compositions containing units of two or more different monomers, including positional isomers. The term "anion exchange resin" is used conventionally herein and refers to strong base anion exchange resins (SBA), weak base anion exchange resins (WBA) and related anionic functional resins, of either the gelular or macroporous type containing quaternary ammonium functionality (chloride, hydroxide or carbonate forms), dialkylamino or substituted dialkylamino functionality (free base or acid salt form), and aminoalkylphosphonate or iminodiacetate functionality, respectively. The term "chloromethylated intermediate" or "CMI" or "chloromethylated copolymer" is used herein to refer to crosslinked poly (vinylaromatic) copolymer that has undergone chloromethylation where copolymer contains an average of 0.5 to 2 chloromethyl groups per aromatic ring.

The following abbreviations are used herein: SBA strong base anion exchange resin; WBA=weak base anion exchange resin; g=grams; ml=milliliters; mm=millimeter, cm=centimeter; pressure is in kilopascals (kPa). Unless otherwise specified, ranges listed are to be read as inclusive and combinable, temperatures are in degrees Celsius (° C.), and references to percentages (%) are by weight.

The method of the present invention is useful for preparing anion exchange resins based on any chloromethylation reaction of crosslinked poly(vinylaromatic) copolymer involving sulfuric acid as a medium. Crosslinked poly (vinylaromatic) copolymers are typically chloromethylated in the process of the present invention by the addition of CSA to an agitated mixture of copolymer, aqueous formaldehyde solution, aqueous hydrochloric acid, methanol and Friedel-Crafts catalyst (for example, ferric chloride). Alternatively, the copolymer and Friedel-Crafts catalyst may be added after forming the solution of CSA, formaldehyde, hydrochloric acid and methanol.

Typically the chloromethylation reaction is conducted by contacting crosslinked poly(vinylaromatic) copolymer with an amount of CME or CME-forming reactants corresponding to 0.5 to 7, preferably 1.5 to 4.5, mole of CME per mole of crosslinked poly(vinylaromatic) copolymer.

Typically the chloromethylation reaction is conducted by maintaining the reaction temperature below about 50° C., preferably from 20 to 45° C. and more preferably from 30 to 45° C., followed by a holding period of zero to 8 hours, preferably from 1 to 4 hours.

Suitable Friedel-Crafts catalysts include, for example, zinc chloride, zinc oxide, ferric chloride, ferric oxide, tin (stannic) chloride, zirconium chloride and aluminum chloride; preferably the catalyst is ferric chloride. The Friedel-Crafts catalyst is typically used in an amount corresponding to 0.01 to 0.2, preferably from 0.02 to 0.1 and more preferably from 0.03 to 0.07, mole catalyst per mole of crosslinked poly(vinylaromatic) copolymer. For the purposes of the present invention, a mole of copolymer is typically based on styrene-divinylbenzene copolymer (p(St-DVB)) having an equivalent molecular weight of 106 grams per gram-mole.

Upon completion of the chloromethylation reaction, the reaction fluid (mother liquor) is made up of primarily sulfuric acid, unreacted CME, methanol, water, $FeCl_3$ and other byproducts of the chloromethylation reaction, such as, for example iron sulfate complexes, methylal (dimethoxymethane), oligomers of formaldehyde and linear polystyrene derivatives.

At the conclusion of the hold period, the reaction mixture is cooled to about 25–30° C. and agitation is stopped. The reaction mixture is allowed to settle for about 5 minutes up to about 1 hour and a portion of the chloromethylation reaction fluid (mother liquor) is removed from the bottom of the settled bead bed by gravity or by siphon means (such as draining, air or nitrogen pressure, or mild vacuum suction) into a collection vessel.

A quench solution is then added to the top of the settled bead bed with continued and simultaneous removal (for example, draining or siphoning) of mother liquor fluid from the bottom of settled bead bed into the same collection vessel described above or into a second collection vessel (contents may be combined later with the contents of the first collection vessel) until the mother liquor collected represents a desired level of sulfuric acid content. The purpose of the "quench" step is to dilute and terminate the chloromethylation reaction so that the CMI may be further processed in the overall preparation of the corresponding anion exchange resin without concerns for safety and environmental issues.

Typically the quench solution is selected from one or more of water, dilute hydrochloric acid, dilute sulfuric acid, methanol and methylal; preferably, the quench solution is water or methanol or a mixture thereof, and more preferably water. Optionally, the quench solution may be a dilute acid solution, such as 1–10% HCl or 1–20% $H_2SO_4$. However, when dilute acid is used as the quench solution, increased amounts of washing of the CMI is required prior to functionalization to an anion exchange resin. Typically the amount of quench solution used corresponds to a ratio of 0.5 to 5, preferably 1 to 4 and more preferably 2 to 3 parts quench solution, by weight, per 1 part CMI, to provide the mother liquor effluent.

The amount of mother liquor effluent collected as described above will vary depending on the specific type of copolymer chloromethylated and the desired degree of functionalization. This mother liquor effluent may be collected in various stages and recombined appropriately to provide a solution suitable for recycle having a concentration of 30 to 90%, preferably from 40 to 70% and more preferably from 45 to 60% sulfuric acid. Typically the mother liquor effluent contains 1 to 20% of CME, either as CME or its component reactants (methanol, formaldehyde, hydrochloric acid); zero to 60%, preferably 5 to 50% and more preferably 10 to 30% of water; and 5 to 30%, preferably 5 to 25% and more preferably 8 to 20% of methanol. Preferably, the mother liquor effluent obtained from prior chloromethylation-quench-reaction sequences that is used in subsequent chloromethylation reactions comprises 40 to 70% sulfuric acid and 1 to 20% CME.

Preferably this mother liquor effluent is used in subsequent chloromethylation reactions without further purification. Typically the amount of mother liquor effluent (obtained from a prior chloromethylation-quench-reaction sequence) used in subsequent chloromethylation reactions is 0.75 to 4, preferably 1 to 3 and more preferably 1.2 to 2.5 parts mother liquor effluent, by weight, per 1 part crosslinked poly(vinylaromatic) copolymer.

Preferably, the quench procedure is conducted by first removing liquid, or a portion thereof, from the mixture of CMI and sulfuric acid without agitation to obtain the mother liquor effluent, followed by the non-agitated plug-flow downward addition of the quench solution to the chloromethylated intermediate. However, the addition of quench solution optionally may be started simultaneously with drawing off the initial mother liquor fluid. After the quench is complete, the CMI is then washed by adding additional water, preferably as described above for the plug-flow quench or, optionally, by mixing (stirred agitation) and draining.

Typically the CMI is functionalized by contact with sufficient aminating agent to provide an anion exchange resin. For example, the washed CMI is neutralized with aqueous NaOH solution to a pH of about 8–10, and an aminating agent (such as trimethylamine, dimethylamine, diethanolamine, aminoalkylphosphonating reagents, iminodiacetate or N-methylglucamine, depending on the type of anion exchange resin desired) is added to the aqueous slurry of CMI. Preferably, the aminating agent is selected from one or more of dimethylamine, trimethylamine, diethanolamine, iminodiacetate and N-methylglucamine. The temperature of the reaction mixture is then raised to 25–60° C. over a period of 1–8 hours and held at 25–60° C. for an additional 1–8 hours. At this point a small amount of 50% aqueous NaOH solution is added to the reaction mixture and any excess volatile aminating agent is recovered by distillation.

The resultant anion exchange resin beads are drained free of residual liquid, and washed with hot water and dilute aqueous HCl to remove residual catalyst and aminating agent. The resulting SBA, WBA or anionic functional resin is characterized for anion exchange capacity (milliequivalents/milliliter (meq/ml) or meq/g (dry resin)), optical appearance (% perfect beads) and other properties as required.

The "deactivation" or "quenching" and isolation of the mother liquor from the CMI using a plug-flow technique, and the direct re-employment (preferably without purification) of at least a portion of the recovered mother liquor in subsequent chloromethylation reactions provides for the improved recovery of sulfuric acid used in the chloromethylation reaction without compromising the physical stability of the resultant anion exchange resin bead. The use of the plug-flow quench procedure allows more efficient recovery of the chloromethylation reaction mother liquor without significant dilution from the quenching fluid itself. In addition, the direct recycling of the recovered mother liquor into subsequent chloromethylation reaction batches further reduces overall costs by reducing usage of fresh raw materials and lessening the need for waste sulfuric acid treatment. Alternatively, any portion of recovered mother liquor that is not recycled into subsequent chloromethylation reactions may be distilled to recover the sulfuric acid in concentrated form which can then be sold or used in other chemical processes.

The fact that recovered mother liquor may be used to replace a portion of the raw materials in subsequent chloromethylation reactions without further purification according to the method of the present invention is unexpected due to the presence of chloromethylation reaction byproducts present in the mother liquor (such as iron sulfate complexes, methylal (dimethoxymethane), oligomers of formaldehyde and linear polystyrene derivatives); these byproducts may be expected to possibly interfere with the desired chloromethylation reaction. Indeed, U.S. Pat. No. 4,636,554, German Patent Application DD 250,128 and U.S. Pat. No. 5,600,022 teach that the reaction fluids from chloromethylation reactions are treated with HCl and further purified and separated into satisfactory raw materials before use in chloromethylation reactions. The method of the present invention, however, avoids these additional separation and purification steps and allows use of the mother liquor, in selected amounts, directly in subsequent chloromethylation reactions.

Table 1 summarizes the relative improvement in sulfuric acid recovery based on use of the method of the present invention. Using the same amount of quench solution (water), a conventional quench with agitation (Example 1) provides mother liquor containing 28% sulfuric acid (52% recovery based on amount of sulfuric acid used in the chloromethylation reaction) versus approximately 50% sulfuric acid (85–90% recovery) in the same amount of recovered mother liquor using the plug-flow quench procedure of the present invention, based on use of recovered mother liquor in 1–6 recycle batches (Example 3).

TABLE 1

Sulfuric Acid Recovery

| Example | Standard Quench with agitation/no use of recycled mother liquor 1 | Plug-Flow Quench without agitation/ with recycle of mother liquor 3* |
|---|---|---|
| Total $H_2SO_4$ (g) per Chloromethylation Reaction | 206 | 242 |
| Quench Water (g) | 330 | 330 |
| % $H_2SO_4$ in Mother Liquor | 28% | 50–54% |
| % Recovery of $H_2SO_4$ in Mother Liquor (380 g) | 52% | 85–90% |

*representative of 1–6 recycle batches

Table 2 summarizes the relative reduction in raw material usage in the chloromethylation reaction based on use of the method of the present invention. Example 3 represents the use of 1.2 parts mother liquor per 1 part crosslinked poly (vinylaromatic) copolymer, corresponding to a 16% reduction in overall fresh raw material (non-polymer) usage in subsequent chloromethylation reactions.

TABLE 2

Raw Material Usage (g) for Chloromethylation Reaction

| Raw Materials | Ex #1 | Ex #3* | % Reduction |
|---|---|---|---|
| p(St-DVB) | 106 | 106 | — |
| CSA | 244 | 207 | 15 |
| 55% HCHO/35% MeOH/10% H20 | 136 | 122 | 10 |
| MeOH | 32 | 10 | 69 |
| 35% HCl (aq) | 40 | 42 | — |
| 40% Ferric Chloride (aq) | 18 | 13 | 28 |
| Recovered Mother Liquor | — | 130 | — |
| Total ("fresh" non-copolymer materials) | 470 | 394 | 16% |

*representative of 1–6 recycle batches

Table 3 summarizes the combined benefits of (1) enhanced sulfuric acid recovery at higher acid concentrations and (2) reduced raw material requirements in subsequent chloromethylation reactions, compared to the conventional quench with agitation and no recycle of mother liquor.

TABLE 3

Sulfuric Acid Recovery and Raw Material Reduction

| Example | Standard Quench with agitation/no use of recycled mother liquor 1 | Plug-Flow Quench without agitation/ with recycle of mother liquor 3* |
|---|---|---|
| % $H_2SO_4$ in Mother Liquor | 28% | 50–54% |
| % Recovery of $H_2SO_4$ in Mother Liquor (380 g) | 52% | 80–90% |

TABLE 3-continued

Sulfuric Acid Recovery and Raw Material Reduction

| Example | Standard Quench with agitation/no use of recycled mother liquor<br>1 | Plug-Flow Quench without agitation/ with recycle of mother liquor<br>3* |
|---|---|---|
| "Fresh" Materials used per Chloromethylation Batch (g) | 470 | 394 |
| % Reduction in "Fresh" Material Usage | 0 | 16% |

*representative of 1–6 recycle batches

Plug-flow hydration/quenching has been used for dilution of sulfonated copolymer reaction mixtures in the manufacture of strong acid cation exchange resins (see EP 223,596-B for further general and specific details); however, this process required the use of relatively concentrated sulfuric acid (for example, 60% or more) as a major part of the hydration or quench fluid. As mentioned earlier, use of even dilute acid quench solutions increases the amount of CMI washing prior to functionalization—use of more highly concentrated acid as a quench solution would exacerbate this problem.

Crosslinked poly(vinylaromatic) copolymers useful in practicing the method of the present invention include those copolymers formed by conventional aqueous suspension polymerization methods, such as batch-kettle polymerization, continuous-semicontinuous jetting column polymerization and combinations thereof. Suitable crosslinked poly(vinylaromatic) copolymers useful in the method of the present invention include those based on monounsaturated vinylaromatic monomers such as, for example, styrene, α-methylstyrene, $(C_1-C_4)$alkyl-substituted styrenes and vinylnaphthalene; preferably the vinylaromatic monomer is selected from the group consisting of styrene and $(C_1-C_4)$alkyl-substituted styrenes. Included among the suitable $(C_1-C_4)$alkyl-substituted styrenes are, for example, ethylvinylbenzenes, vinyl-toluenes, diethylstyrenes, ethylmethylstyrenes and dimetbylstyrenes; it is understood that any of the various positional isomers of each of the aforementioned vinylaromatic monomers is suitable. Copolymers, such as those prepared from mixtures of any of the aforementioned monomers, may also be used in the present invention. Typically, the crosslinked poly (vinylaromatic) copolymers will contain 80 to 99%, preferably 90 to 99% and more preferably 93 to 98% vinylaromatic monomer as polymerized units.

Optionally, non-aromatic vinyl monomers, such as aliphatic unsaturated monomers, for example, vinyl chloride, acrylonitrile, methacrylonitrile and $(C_1-C_4)$alkyl esters of (meth)acrylic acids (such as methyl acrylate) may also be used in addition to the vinylaromatic monomer. When used, the non-aromatic vinyl monomers typically comprise as polymerized units, from zero to 20%, preferably from zero to 10%, and more preferably from zero to 5%, based on the total monomer weight used to form the crosslinked poly (vinylaromatic) copolymer.

Among the crosslinkers that may be copolymerized with the monounsaturated monomers from above to provide crosslinked poly(vinylaromatic) copolymer useful in the present invention are aromatic polyvinyl compounds (typically from 0.1 to 20%, preferably from 0.5 to 10% and more preferably from 2 to 7% of the crosslinked poly (vinylaromatic) copolymer) such as divinylbenzene, trivinylbenzene, divinyltoluene, divinylpyridine, divinylnaphthalene and divinylxylene; and non-aromatic crosslinking monomers such as ethyleneglycol diacrylate, ethyleneglycol dimethacrylate, trimethylol-propane triacrylate, trimethylolpropane trimethacrylate, diethyleneglycol divinyl ether, trivinylcyclohexane, 1,5-hexadiene, 2,5-dimethyl-1,5-hexadiene, 1,7-octadiene and triallyl isocyanurate. When used, the aliphatic crosslinking monomers typically comprise as polymerized units, from zero to 10%, preferably from zero to 5%, and more preferably from zero to 2% of the crosslinked poly(vinylaromatic) copolymer. Preferably, the crosslinked poly(vinylaromatic) copolymer used in the method of the present invention is a styrene-ethylvinylbenzene-divinylbenzene copolymer (commonly referred to as St-DVB copolymer or p(St-DVB)) containing from 0.1 to 20%, preferably from 2 to 7%, of polymerized divinylbenzene monomer units.

Crosslinked poly(vinylaromatic) copolymers useful in the present invention are typically prepared using free-radical initiators, including monomer-soluble initiators such as organic peroxides, hydroperoxides and related initiators, as for example benzoyl peroxide, cumene peroxide, tetralin peroxide, acetyl peroxide, lauroyl peroxide, caproyl peroxide, tert-butyl peroctoate (also known as tert-butylperoxy-2-ethylhexanoate), tert-butyl perbenzoate, tert-butyl diperphthalate, bis(4-tert-butylcyclohexyl)peroxydicarbonate and tert-butyl peroxypivalate. Also useful are azo initiators such as azodiisobutyronitrile, azodiisobutyramide, 2,2'-azo-bis(2,4-dimethylvalero-nitrile), azo-bis(α-methylbutyronitrile) and dimethyl-, diethyl- or dibutyl azo-bis-(methylvalerate).

Suitable aqueous phase dispersants and suspension stabilizers useful in preparing crosslinked poly(vinylaromatic) copolymer used in the method of the present invention include, for example, starch, gelatin, celluloses, carboxymethylcellulose, polyacrylic acids, polyvinyl alcohol, polyvinyl pyrrolidones, finely divided particles (such as silica, clays, ground ion exchange resins) and inorganic salts such as calcium hydroxyphosphate, particularly in combination with hydroxyapatite. The inorganic salts may or may not be fully soluble in water, and where they are not fully soluble they may behave similarly to the finely divided particles. Mixtures of dispersants may also be used. Soluble inorganic salts, such as sodium chloride and sodium sulfate, may also be used in addition to the dispersants named above to the reduce the solubility of unsaturated monomers in the aqueous phase.

Preferably, the crosslinked poly(vinylaromatic) copolymers are gelular copolymers, however, macroporous copolymers may also be used in the method of the present invention. Preferred macroporous copolymer beads are those of the type described in U.S. Pat. No. 4,382,124, in which porosity is introduced into the copolymer beads by suspension polymerization in the presence of a porogen (also known as "phase extender" or "precipitant"), that is, a solvent for the monomer but a non-solvent for the polymer.

A typical macroporous copolymer preparation, for example, may include preparation of a continuous aqueous phase solution containing suspension aids (such as dispersants, protective colloids and buffers) followed by mixing with a monomer mixture containing 80 to 99% (preferably 90 to 99%, more preferably 93 to 98%) vinylaromatic monomer, 0.1 to 20% polyvinyl crosslinking monomer, free-radical initiator and 0.2 to 1 parts porogen (such as toluene, xylenes, $(C_4-C_{10})$-alkanols, $(C_6-C_{12})$-saturated hydrocarbons or polyalkylene glycols) per one part monomer. The mixture of monomers and porogen is then polymerized at elevated temperature and the porogen is subsequently removed from the resulting polymer beads by various means; for example, toluene, xylene and ($C_4$–$C_{10}$) alcohols may be removed by distillation or solvent washing, and polyalkylene glycols by water washing. Suitable ($C_4$–$C_{10}$)-alkanols include, for example, t-amyl alcohol (2-methyl-2-butanol), methylisobutylcarbinol (MIBC or 4-methyl-2-pentanol), n-butyl alcohol, sec-butyl alcohol, isobutyl alcohol, 2-ethylhexanol and decanol. Suitable ($C_6$–$C_{12}$)-saturated hydrocarbons include, for example, hexane, heptane and isooctane.

Crosslinked poly(vinylaromatic) copolymers used in the method of the present invention are typically in the form of spherical beads having a volume average particle size distribution from about 0.1 to about 2 mm diameter. Preferably, the particle size distribution is from 0.15 to 1.0 mm (typically greater than 95%), more preferably from 0.3 to 0.7 mm and most preferably form 0.4 to 0.6 mm (typically greater than 90%), corresponding approximately to 18–100, 20–50 and 30–40 mesh (U.S. standard screen size), respectively.

Some embodiments of the invention are described in detail in the following Examples. All ratios, parts and percentages are expressed by weight unless otherwise specified, and all reagents used are of good commercial quality unless otherwise specified. Abbreviations used in the Examples and Tables are listed below:

| | |
|---|---|
| p(St-DVB) | Styrene-Divinylbenzene Copolymer |
| CME | Chloromethyl Methyl Ether |
| CSA | Chlorosulfonic Acid |
| HCHO | Formaldehyde |
| MeOH | Methanol |
| meq/ml | Milliequivalents/Milliliter |
| meq/g | Milliequivalents/Gram (dry) |
| % PB | % Perfect Beads (whole and crack-free) |

EXAMPLE 1 (COMPARATIVE)

This is a description of the use of a conventional stirred (agitated) quench procedure with no recovery and recycle of the reaction liquor. A chloromethylated intermediate is prepared by adding 244 g of CSA over a 4 hour period to an agitated reaction vessel containing 106 g of p(St-DVB) containing 4.3% DVB, 136 g of an aqueous formaldehyde solution (55% formaldehyde, 35% MeOH), 40 g of aqueous HCl (35%), 32 g of MeOH and a sufficient amount (typically about 15 g) aqueous ferric chloride (40%) solution to provide a molar ratio of ferric chloride to p(St-DVB) of 0.04/1. The temperature of the reaction mixture during the CSA addition is maintained at 40° C. and below. After completion of the CSA addition, the reaction mixture is held at 38–40° C. for a period of 2.5 hours with agitation. The reaction mixture is cooled to 25–30° C. and a quench solution (330 g of water) is added to the chloromethylated intermediate while agitating. After mixing the quenched reaction mixture for 10–30 minutes, the mother liquor is drained from the bottom of the reaction vessel into a collection bottle until 380 g have been collected (% $H_2SO_4$= 28%, calculated). The chloromethylated intermediate is then washed with additional water as described above.

The washed chloromethylated intermediate is slurried with 200–400 g of water and neutralized with 50% aqueous NaOH to a pH of 8–10; this is followed by the addition of 176 g of a 40% aqueous solution of trimethylamine with cooling to maintain a temperature of 20 –25° C. The temperature of the reaction mixture is then raised to 50° C. over 3 hours and held at 50° C. for an additional 2 hours. At this point 8 g of a 50% aqueous NaOH solution is added to the reaction mixture and excess trimethylamine is recovered by distillation. The resultant anion exchange resin beads (SBA) are drained free of residual liquid, and washed with hot water and dilute aqueous HCl to remove residual iron and trimethylamine contaminants. The resulting SBA typically has an anion exchange capacity of 1.3 meq/ml (4.1 meq/g) with 99% PB.

EXAMPLE 2

A chloromethylated intermediate was prepared by adding 244 g of CSA over a 4 hour period to an agitated reaction vessel containing 106 g of p(St-DVB) containing 4.3% DVB, 136 g of an aqueous formaldehyde solution (55% formaldehyde, 35% MeOH), 40 g of aqueous HCl (35%), 32 g of MeOH and a sufficient amount (typically about 15 g) aqueous ferric chloride (40%) solution to provide a molar ratio of ferric chloride to p(St-DVB) of 0.04/1. The temperature of the reaction mixture during the CSA addition was maintained at 40° C. and below. After completion of the CSA addition, the reaction mixture was held at 38 –40° C. for a period of 2.5 hours with agitation.

The reaction mixture was then cooled to 25–30° C., the agitation was stopped and the mixture was allowed to settle for at least 5 minutes up to 1 hour. An initial portion of liquid was drained from the bottom of the bead bed into a collection bottle. A quench solution (330 g of water) was then slowly added to the top of the bead bed while draining additional liquid from the bottom of the reaction vessel into the same collection bottle until 380 g (mother liquor, % $H_2SO_4$=50%) had been collected. Remaining liquid was then drained from the bead bed and the chloromethylated intermediate was washed by adding additional water to the top of the bead bed while draining liquid from the bottom.

The washed chloromethylated intermediate was slurried with 200–400 g of water and neutralized with 50% aqueous NaOH to a pH of 8–10; this was followed by the addition of 176 g of a 40% aqueous solution of trimethylamine with cooling to maintain a temperature of 20–25° C. The temperature of the reaction mixture was then raised to 50° C. over 3 hours and held at 50° C. for an additional 2 hours. At this point 8 g of a 50% aqueous NaOH solution was added to the reaction mixture and excess trimethylamine was recovered by distillation. The resultant anion exchange resin beads (SBA) were drained free of residual liquid, and washed with hot water and dilute aqueous HCl to remove residual iron and trimethylamine contaminants. The resulting SBA had an anion exchange capacity of 1.3 meq/ml (4.1 meq/g) with 99% PB.

EXAMPLE 3

The chloromethylation procedure of Example 2 was repeated except that 207 g of CSA was added to an agitated reaction vessel containing 106 g of p(St-DVB) containing 4.3% DVB, 122 g of an aqueous formaldehyde solution (55% formaldehyde, 35% MeOH), 42 g of aqueous HCl (35%), 10 g of MeOH, 130 g of recovered mother liquor from Example 2, and about 15 g aqueous ferric chloride (40%) solution to provide a molar ratio of ferric chloride to p(St-DVB) of 0.03–0.1/1, typically 0.04/1. Quenching, washing and amination to provide SBA were performed as described in Example 2. The resultant SBA typically had an anion exchange capacity of 1.3 meq/ml (4.0 meq/g) with 98% PB.

Subsequent repetitions of the chloromethylation reaction were carried out as described in Example 3, up to 6 recycle batches. All of the resulting SBA produced had anion exchange capacities and % PB properties substantially equivalent to the SBA described in Example 2.

EXAMPLE 4

A chloromethylated intermediate was prepared by gradually adding 178 g of CSA to an agitated mixture containing 100 g of macroporous p(St-DVB) containing 6% DVB, 134 g of an aqueous formaldehyde solution (55% formaldehyde, 35% MeOH), 216 g of 96% sulfuric acid, 91 g of aqueous HCl (35%), 14 g of MeOH, and ferric chloride solution. The ferric chloride was employed as a 40% aqueous solution in amount to provide a molar ratio of ferric chloride to p(St-DVB) of 0.04/1. The temperature of the reaction mixture during the CSA addition was maintained at 45° C. and below. After completion of the CSA addition, the reaction mixture was held at 40–50° C. for a period of 6 hours with agitation.

The reaction mixture was then cooled to 25–30° C., the agitation was stopped and the mixture was allowed to settle for at least 5 minutes up to 1 hour. An initial portion of liquid was drained from the bottom of the bead bed into a collection bottle. A quench solution (240 g of water) was then slowly added to the top of the bead bed while draining additional liquid g from the bottom of the reaction vessel into the same collection bottle, until all liquid had been drained from the bead bed; in this manner 550 g of mother liquor (% $H_2SO_4$=56%) was collected. The chloromethylated intermediate was then washed by adding additional water to the top of the bead bed while draining liquid from the bottom.

The washed chloromethylated intermediate was slurried with 200–400 g of water and neutralized with 50% aqueous NaOH to a pH of 8–10. This was followed by the addition of 535 g of 24% aqueous NaOH and 190 g of a 40% aqueous solution of dimethylamine with cooling to maintain a temperature of 20–25° C. The temperature of the reaction mixture was then raised from 25° C. to 74° C. and held at 74° C. for an additional 2 hours under pressure (0.7 –1.4× $10^2$ kPa or 10–20 pounds per square inch), followed by distillation to remove residual amine. The resultant anion exchange resin beads (WBA) were drained free of residual liquid, and washed with hot water and dilute aqueous HCl to remove residual iron and dimethylamine contaminants. The resulting WBA had an anion exchange capacity of 1.4 meq/ml (5.0 meq/g) with 100% PB.

EXAMPLE 5

The chloromethylation procedure of Example 4 was repeated except that 223 g of CSA was added to an agitated reaction vessel containing 100 g of macroporous p(St-DVB) containing 6% DVB, 115 g of an aqueous formaldehyde solution (55% formaldehyde, 35% MeOH), 36 g of 96% sulfuric acid, 20 g of aqueous HCl (35%), 250 g of recovered mother liquor from Example 4, and about 15 g aqueous ferric chloride (40%) solution to provide a molar ratio of ferric chloride to p(St-DVB) of 0.03–0.1/1, typically 0.04/1. Quenching, washing and amination to provide WBA were performed as described in Example 4. The resultant WBA typically had an anion exchange capacity of 1.4 meq/ml (4.8 meq/g) with 100% PB.

Subsequent repetitions of the chloromethylation reaction were carried out as described in Example 5, up to 7 recycle batches. All of the resulting WBA produced had anion exchange capacities and % PB properties substantially equivalent to the WBA described in Example 4.

EXAMPLE 6

A chloromethylating mixture was prepared by adding 249 g CSA of over a 4–5 hour period to an agitated reaction vessel containing 115 g of an aqueous formaldehyde solution (55% formaldehyde, 35% MeOH), 27 g of MeOH and 44 g of water. The temperature of the reaction mixture during the CSA addition was maintained at 45° C. and below. To this mixture was added 106 g of p(St-DVB) containing 6.5% DVB, followed by the gradual addition of sufficient aqueous ferric chloride (40%) solution to provide a molar ratio of ferric chloride to p(St-DVB) of 0.04/1. After completion of the ferric chloride addition, the reaction mixture was held at 40° C. for a period of 4 hours with agitation.

The reaction mixture was then cooled to 25–30° C., the agitation was stopped and the mixture was allowed to settle for at least 5 minutes up to 1 hour. An initial portion (195 g) of liquid was drained from the bottom of the bead bed into a collection bottle. A quench solution (75 g of MeOH) was then slowly added to the top of the bead bed while draining liquid from the bottom of the reaction vessel into a second collection bottle (125 g of mother liquor, % $H_2SO_4$=54%). The chloromethylated intermediate was then washed by adding additional methanol to the top of the bead bed while draining liquid from the bottom.

To the washed chloromethylated intermediate was then added 220 g of water and 165 g of dimethoxymethane (methylal). This mixture was agitated and neutralized (pH of 8–10) with 50% aqueous NaOH. To this mixture was added 212 g of a 40% aqueous solution of trimethylamine, followed by holding the temperature of the reaction mixture at 40° C. for 4 hours. Excess trimethylamine and dimethoxymethane were then removed and recovered by distillation. The resultant anion exchange resin beads (SBA) were drained free of residual liquid, and washed with hot water and dilute aqueous HCl to remove residual iron and trimethylamine contaminants. The resulting SBA had an anion exchange capacity of 1.6 meq/ml (3.8 meq/g) with 98% PB.

EXAMPLE 7

The chloromethylation procedure of Example 6 was repeated except that 177 g of CSA was added to an agitated mixture of 114 g of an aqueous formaldehyde solution (55% formaldehyde, 35% MeOH), 50 g of aqueous HCl (35%) and 125 g of recovered mother liquor from the second collection bottle in Example 6. The temperature of the reaction @ mixture during the CSA addition was maintained at 45° C. and below. To this mixture was added 106 g of p(St-DVB) containing 6.5% DVB, followed by the gradual addition of sufficient aqueous ferric chloride (40%) solution to provide a molar ratio of ferric chloride to p(St-DVB) of 0.03–0.1/1. After completion of the ferric chloride addition, the reaction mixture was held at 40° C. for a period of 4 hours with agitation. Quenching, washing, and amination of the product was carried out as described in Example 6. The resultant SBA typically had an anion exchange capacity of 1.6 meq/ml (4.0 meq/g) with 97% PB Subsequent repetitions of the chloromethylation reaction were carried out as described in Example 7, up to 5 recycle batches. All of the resulting SBA produced had anion exchange capacities and % PB properties substantially equivalent to the SBA described in Example 6.

We claim:

1. A method for preparing anion exchange resins in a multi-batch process, comprising:
   (i) in a first chloromethylation reaction, the steps of:
      (a) chloromethylating a first crosslinked poly (vinylaromatic) copolymer in the presence of sulfuric acid to provide a mixture of a first chloromethylated intermediate and sulfuric acid;
      (b) quenching the first chloromethylated intermediate to provide a quenched first chloromethylated intermediate by a non-agitated plug-flow downward addition of a quench solution to the mixture of first chloromethylated intermediate and sulfuric acid to obtain a first mother liquor effluent comprising 30 to 90% sulfuric acid; and
      (c) isolating the first mother liquor effluent for reuse in one or more subsequent chloromethylation reactions; and
   (ii) in a second chloromethylation reaction, the steps of:
      (a') chloromethylating a second crosslinked poly (vinylaromatic) copolymer in the presence of sulfuric acid and a portion of mother liquor effluent obtained from a prior chloromethylation-quench reaction sequence to provide a mixture of a second chloromethylated intermediate and sulfuric acid;
      (b') quenching the second chloromethylated intermediate to provide a quenched second chloromethylated intermediate by a non-agitated plug-flow downward addition of a quench solution to the mixture of second chloromethylated intermediate and sulfuric acid to obtain a second mother liquor effluent comprising 30 to 90% sulfuric acid; and
      (c') isolating the second mother liquor effluent for reuse in one or more subsequent chloromethylation reactions.

2. The method of claim 1 wherein a portion of the first or second mother liquor effluent is used in one or more subsequent chloromethylation reactions that are repeated as described in part (ii), steps (a') through (c').

3. The method of claim 1 wherein the crosslinked poly (vinylaromatic) copolymer is a gelular copolymer.

4. The method of claim 1 wherein the quench solution comprises one or more of water, dilute hydrochloric acid, dilute sulfuric acid, methanol and methylal.

5. The method of claim 1 wherein the chloromethylated intermediate is quenched with quench solution at a ratio of 0.5 to 5 parts quench solution, by weight, per 1 part chloromethylated intermediate to provide the mother liquor effluent.

6. The method of claim 1 wherein one or more of steps (b) and (b') of parts (i) and (ii), respectively, are conducted by first removing liquid from the mixture of chloromethylated intermediate and sulfuric acid without agitation to obtain the mother liquor effluent, followed by the non-agitated plug-flow downward addition of the quench solution to the chloromethylated intermediate.

7. The method of claim 1 wherein 0.75 to 4 parts of mother liquor effluent obtained from a prior chloromethylation-quench-reaction sequence is used per 1 parts of crosslinked poly(vinylaromatic) copolymer in part (ii), step (a').

8. The method of claim 1 wherein the mother liquor effluent obtained from a prior chloromethylation-quench-reaction sequence used in part (ii), step (a'), comprises 40 to 70% sulfuric acid and 1 to 20% chloromethyl methyl ether.

9. The method of claim 1 further comprising aminating the quenched chloromethylated intermediate resulting from step (b) or (b') by contacting the quenched chloromethylated intermediate with sufficient aminating agent to provide an anion exchange resin.

10. An improved method for preparing anion exchange resins in a multi-batch process wherein a crosslinked poly (vinylaromatic) copolymer is chloromethylated in the presence of sulfuric acid to provide a mixture of a chloromethylated intermediate and sulfuric acid, followed by quenching the chloromethylated intermediate with quenching solution and finally functionalizing the chloromethylated intermediate with an aminating agent, the improvement comprising:
   (a) quenching the chloromethylated intermediate by a non-agitated plug-flow downward addition of a quench solution to the mixture of chloromethylated intermediate and sulfuric acid to obtain a mother liquor effluent comprising 30 to 90% sulfuric acid;
   (b) isolating the mother liquor effluent for reuse in subsequent chloromethylation reactions; and
   (c) chloromethylating additional crosslinked poly (vinylaromatic) copolymer in the presence of sulfuric acid and a portion of mother liquor effluent comprising 30 to 90% sulfuric acid obtained from a prior chloromethylation-quench reaction sequence.

11. The method of claim 1 wherein the crosslinked poly(vinylaromatic) copolymer is styrene/ ethylvinylbenzene/divinylbenzene copolymer comprising 2 to 7 percent of polymerized divinylbenzene monomer units, based on weight of the crosslinked poly(vinylaromatic) copolymer.

12. The method of claim 1 wherein the crosslinked poly(vinylaromatic) copolymer is a macroporous copolymer.

13. The method of claim 7 wherein 1 to 3 parts of mother liquor effluent obtained from a prior chloromethylation-quench-reaction sequence is used per 1 parts of crosslinked poly(vinylaromatic) copolymer.

14. The method of claim 9 wherein the aminating agent is selected from one or more of dimethylamine, trimethylamine, diethanolamine, iminodiacetate and N-methylglucamine.

* * * * *